C. ROGGASCH, DEC'D.
A. ROGGASCH, ADMINISTRATRIX.
VEHICLE.
APPLICATION FILED MAY 6, 1916.
1,216,246.
Patented Feb. 13, 1917.
2 SHEETS—SHEET 1.
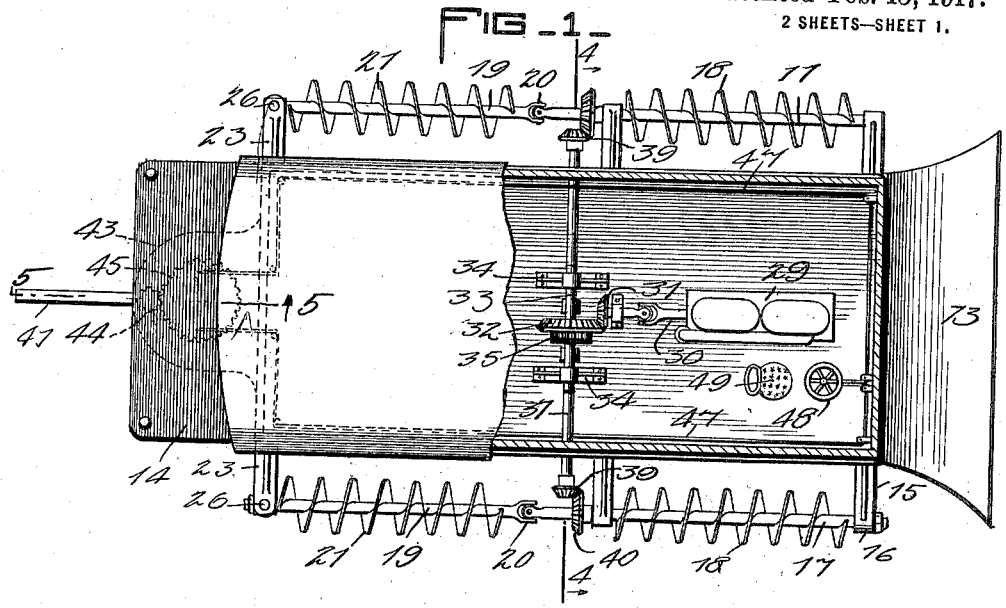
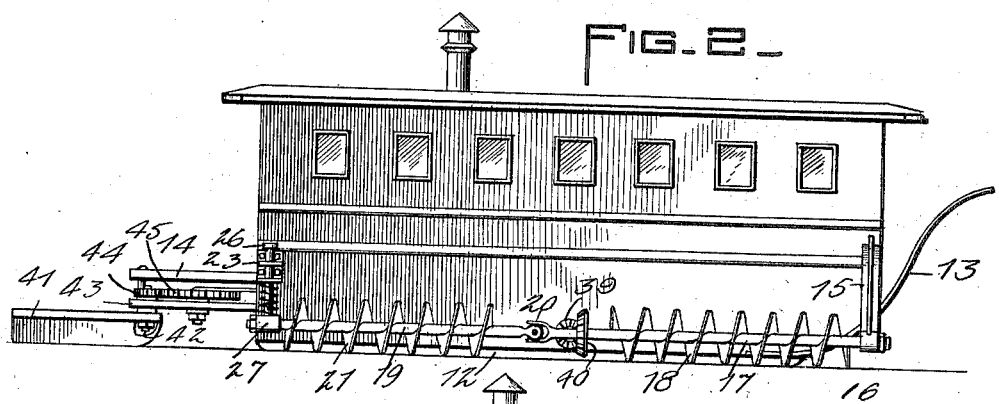
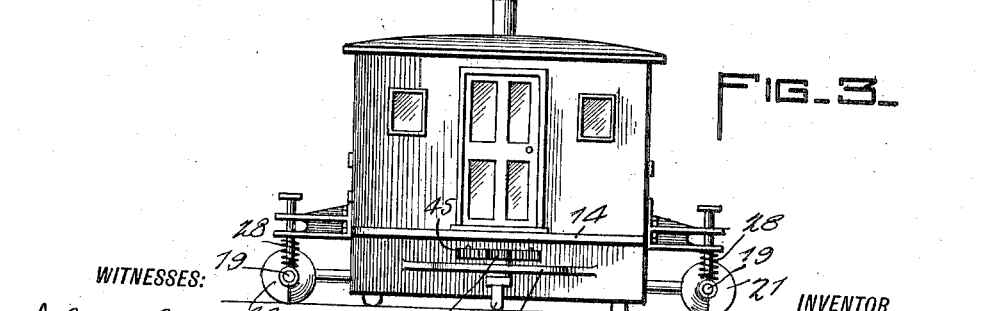
WITNESSES:
INVENTOR
CHARLES ROGGASCH
BY
ATTORNEYS C. ROGGASCH, DEC'D.
A. ROGGASCH, ADMINISTRATRIX.
VEHICLE.
APPLICATION FILED MAY 6, 1916.
1,216,246.
Patented Feb. 13, 1917.
2 SHEETS—SHEET 2.
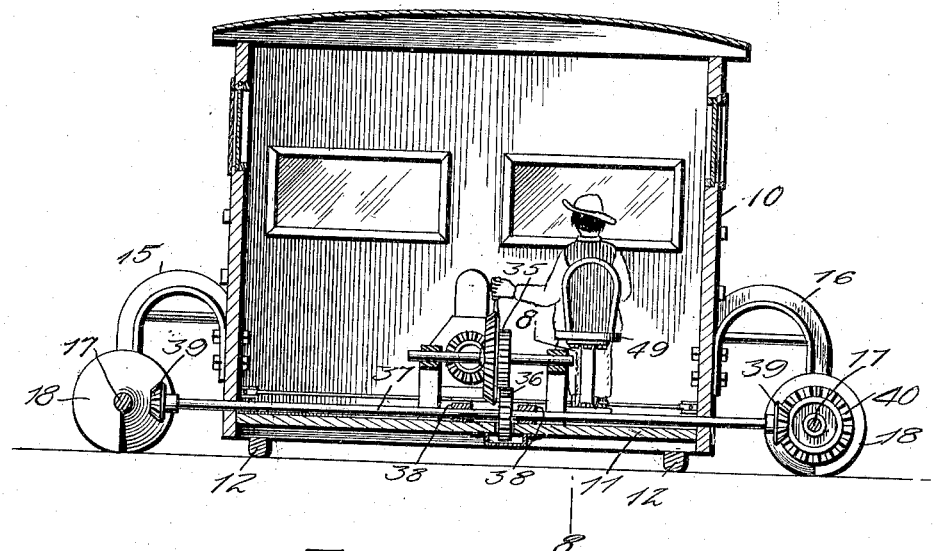
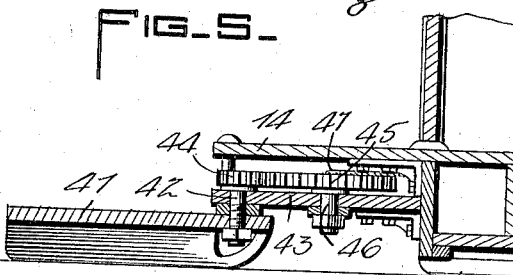
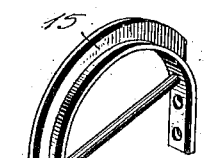
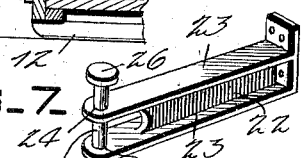
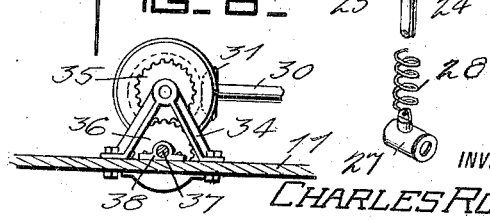
INVENTOR
CHARLES ROGGASCH
BY
ATTORNEYS

UNITED STATES PATENT OFFICE.

CHARLES ROGGASCH, OF AINSWORTH, NEBRASKA; AUGUSTE ROGGASCH ADMINISTRATRIX OF CHARLES ROGGASCH, DECEASED.

VEHICLE.

1,216,246.

Specification of Letters Patent.

Patented Feb. 13, 1917.

Application filed May 6, 1916. Serial No. 95,849.

*To all whom it may concern:*

Be it known that I, CHARLES ROGGASCH, a citizen of the United States, and a resident of Ainsworth, in the county of Brown and State of Nebraska, have invented an Improvement in Vehicles, of which the following is a specification.

This invention is an improvement in vehicles and has particular reference to an improved power propelled vehicle adapted for travel over ice, snow and bodies of water.

An object of the invention is to provide a vehicle of the sled type and of simple and inexpensive construction which may be propelled by an engine and which includes a plurality of traction or propelling elements arranged in a novel manner and operated by said engine to propel the vehicle.

The inventive idea involved is capable of receiving a variety of mechanical expressions, one of which, for the purpose of illustrating the invention, is shown in the accompanying drawings, in which—

Figure 1 is a top plan view of the vehicle partly broken away and shown in section.

Fig. 2 is a side elevation thereof.

Fig. 3 is a rear end elevation.

Fig. 4 is a transverse section on the line 4—4 of Fig. 1 looking in the direction of the arrows.

Fig. 5 is a longitudinal section on the line 5—5 of Fig. 1.

Fig. 6 is a detail perspective view of one of the hangers employed for supporting certain of the propelling means.

Fig. 7 is a similar view of a bracket and means for yieldingly supporting other of the propelling means.

Fig. 8 is a transverse section on the line 8—8 of Fig. 4.

There is illustrated in the drawings what is now believed to be a preferred form of the invention, which comprises a body portion 10 preferably having a flat bottom 11 which is made water tight in order that the body will float. Said body portion is also provided with longitudinally extending runners 12 which are employed when traveling over ice or snow surfaces. It is also to be noted that by providing the body portion with a flat bottom the same will be prevented from sinking deeply into soft surfaces, which fact would otherwise render difficult the propelling of the vehicle. The front of the vehicle is provided with an upwardly extending dash-board 13 while the rear thereof has a platform 14.

To the sides of the vehicle and at the front thereof there are secured at oppositely disposed points the inverted substantially U-shaped brackets 15 each of which is provided at one extremity with a bearing 16 for receiving one end of a forward shaft 17, said shafts being arranged in spaced relation to and longitudinally of the sides of the body and being provided with forward helical propelling or traction elements 18. The rear ends of the shafts 17 are joined to the front ends of the rear shafts 19 by means of the universal joints 20, said rear shafts being also provided with the helical propelling or traction elements 21. The sides of the body 10 at the rear thereof have extending laterally therefrom the hanger devices 22 each of which consists of spaced arms 23 arranged in parallel relation and having in their outer ends the alined openings 24 for receiving the vertically arranged rod 25 having a head 26 at its upper end to limit downward movement of said rod through said openings. The lower end of the rod 25 is provided with a bearing 27 for receiving the rear end of the adjacent rear shaft 19. Interposed between the bearing 27 and the lower arm 23 of the hanger is a coil spring 28 which yieldingly supports the rear end of the shaft 19 so that the same will have a slight vertical movement and thus permit of easy travel over rough surfaces.

The means for driving the shafts 17 and 19 preferably comprises a source of power 29, such as an engine of any type, having the drive shaft 30 extending rearwardly therefrom and provided upon its rear end with a small beveled gear 31 which meshes with a larger beveled gear 32 mounted upon a short shaft 33 supported in bearings 34 secured to the bottom 11 of the body intermediate its ends. The shaft 33 also has mounted thereon the gear wheel 35 which meshes with a similar gear wheel 36 carried by the shaft 37 which extends transversely of the body and adjacent the bottom thereof, said shaft 37 being mounted in bearings 38 and extending through the sides of the body 10. The extremities of the shaft 37 have mounted thereon the beveled gears 39 which mesh with similar gears 40 fixed to the shafts 17 adjacent the rear thereof and arranged so that all of the shafts 17 and 19 will be driven toward each other, or inward at the top and outward at the bottom.

Means for steering the vehicle are also provided and preferably consist of a rudder 41 mounted upon a pivot bolt 42 supported in the bracket 43 secured to the rear of the vehicle and beneath the platform 14. The bolt 42 is provided at its upper end with a gear wheel 44 which meshes with a similar gear wheel 45 mounted upon a bolt 46. The extremities of flexible steering lines 47 are secured to the gear 45 from whence the same pass over suitable pulleys and along the sides of the body 10 interiorly thereof and are then connected to a steering wheel 48 mounted in the forward end of the vehicle adjacent the operator's seat 49.

What is claimed is:

1. A vehicle of the character described, comprising a body portion having a flat bottom, runners extending longitudinally of said bottom, substantially U-shaped brackets carried by the forward end of said body portion and having bearings at their free extremities, forward propelling devices having their front ends mounted in said bearings, hangers extending laterally from the body portion adjacent the rear end thereof, vertically movable rods mounted in said hangers and having bearings at their lower ends, springs interposed between said bearings and said hangers for yieldingly supporting said rods in position, rear propelling devices having their rear ends mounted in the bearings of said movable rods, universal joints connecting the front ends of said rear propelling devices with the rear ends of said forward propelling devices, gears carried by certain of said propelling devices, a driven shaft extending transversely of said body portion and having gears at its extremity meshing with the first-named gears, and means mounted in the body portion for driving said driven shaft.

2. A vehicle of the character described, comprising a body portion having a flat bottom, runners extending longitudinally of said bottom, substantially U-shaped brackets carried by the forward end of said body portion and having bearings at their free extremities, forward propelling devices having their front ends mounted in said bearings, hangers extending laterally from the body portion adjacent the rear end thereof, vertically movable rods mounted in said hangers and having bearings at their lower ends, springs interposed between said bearings and said hangers for yieldingly supporting said rods in position, rear propelling devices having their rear ends mounted in the bearings of said movable rods, universal joints connecting the front ends of said rear propelling devices with the rear ends of said forward propelling devices, and means mounted interiorly of said body portion and connected to certain of said propelling devices for operating the same.

3. A vehicle comprising a body portion having a flat bottom, a platform extending rearwardly from the rear end of said body portion, a bracket also extending from the rear end of said body portion, a pivot bolt mounted in said bracket, a rudder secured to said bolt, a gear also carried by said bolt between said bracket and said platform, another gear meshing with the first-named gear, a flexible element having its extremities connected to the second-named gear, and a steering wheel connected to said flexible element for operating the same to oscillate said gears whereby the rudder is swung about its pivot.

CHARLES ROGGASCH.

Signed in presence of—
 ERNEST A. HOUSE,
 I. W. MEFFERD.

Copies of this patent may be obtained for five cents each, by addressing the "Commissioner of Patents, Washington, D. C."